(12) United States Patent
Farzbod et al.

(10) Patent No.: US 9,596,536 B2
(45) Date of Patent: Mar. 14, 2017

(54) MICROPHONE ARRANGED IN CAVITY FOR ENHANCED VOICE ISOLATION

(71) Applicant: Google Inc., Mountain View, CA (US)

(72) Inventors: Farhad Farzbod, Sunnyvale, CA (US); Michael Kai Morishita, Belmont, CA (US); Jianchun Dong, Palo Alto, CA (US); Richard Daniel Herr, Pleasanton, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/806,464

(22) Filed: Jul. 22, 2015

(65) Prior Publication Data

US 2017/0026744 A1    Jan. 26, 2017

(51) Int. Cl.
*H04R 1/02* (2006.01)
*H04R 1/46* (2006.01)

(52) U.S. Cl.
CPC ......... *H04R 1/46* (2013.01); *H04R 2201/003* (2013.01)

(58) Field of Classification Search
CPC ............................ H04R 1/2869; H04R 1/2876
USPC ...... 381/151, 306, 327, 55, 56, 59, 181, 380
See application file for complete search history.

(56) References Cited

U.S. PATENT DOCUMENTS

| 6,061,456 A * | 5/2000 | Andrea | ................ G10K 11/178 381/71.13 |
|---|---|---|---|
| 7,778,430 B2 | 8/2010 | Nakajima et al. | |
| 8,437,492 B2 | 5/2013 | Goldstein et al. | |
| 9,042,586 B2 | 5/2015 | Burns et al. | |
| 2005/0254778 A1 * | 11/2005 | Pettersen | ................ H04R 1/44 386/333 |
| 2009/0321177 A1 * | 12/2009 | McMahon | ............. G10K 11/22 181/135 |
| 2010/0092021 A1 * | 4/2010 | Wiskerke | ................ H04R 1/08 381/364 |
| 2010/0290660 A1 * | 11/2010 | Fukuda | ................ H04R 7/122 381/355 |
| 2011/0243350 A1 * | 10/2011 | Miller | ................ H04R 23/006 381/111 |

(Continued)

FOREIGN PATENT DOCUMENTS

| CN | 203720479 U | * 7/2014 |
|---|---|---|
| EP | 2843915 | 3/2015 |

OTHER PUBLICATIONS

"AOS Bluetook Full Bone Conduction Glasses, Smart Glasses," AOS, http://www.amazon.com/Bluetooth-Full-Conduction-Glasses-Smart/dp/B00R73NO06/ref=sr_1_2?ie=UTF8&qid=1434388987&sr=8-2&keywords=bone+conduction . . . , last accessed Jul. 9, 2015, 5 pages.

*Primary Examiner* — Curtis Kuntz
*Assistant Examiner* — Julie X Dang
(74) *Attorney, Agent, or Firm* — McDonnell Boehnen Hulbert & Berghoff LLP (57) ABSTRACT

The present application describes bone conduction microphone (BCM) systems and applications thereof. An example apparatus includes: (a) an enclosing structure having a cavity therein, wherein a first portion of the enclosing structure is formed by an elastic material, and wherein the elastic material is moveable to transfer vibration from an exterior source to gas within the cavity; and (b) a microphone coupled to the enclosing structure and located within the gas-filled cavity, wherein gas in the cavity separates the microphone from the first portion of the enclosing structure, such that the vibration transferred from the exterior source to the gas in the cavity is detectable by the microphone.

18 Claims, 8 Drawing Sheets

(56) References Cited

U.S. PATENT DOCUMENTS

2013/0329918 A1\* 12/2013 Kubba ................. G02B 27/017
  381/151
2014/0270244 A1\* 9/2014 Fan ........................ G02C 11/10
  381/91

\* cited by examiner

MICROPHONE ARRANGED IN CAVITY FOR ENHANCED VOICE ISOLATION

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

In one aspect, an example apparatus includes: (a) an enclosing structure having a cavity therein, wherein a first portion of the enclosing structure is formed by an elastic material, and wherein the elastic material is moveable to transfer vibration from an exterior source to gas within the cavity; and (b) a microphone coupled to the enclosing structure and located within the gas-filled cavity, wherein gas in the cavity separates the microphone from the first portion of the enclosing structure, such that the vibration transferred from the exterior source to the gas in the cavity is detectable by the microphone.

In another aspect, a wearable-device apparatus includes: (a) a device component of a wearable device, wherein at least portion of the device component forms an enclosing structure having a gas-fillable cavity therein, wherein at least a portion of the enclosing structure is formed by an elastic material, and wherein the elastic material is moveable to transfer vibration from an exterior source to gas within the cavity; and (b) a microphone coupled to the enclosing structure and located within the gas-filled cavity, wherein gas in the cavity separates the microphone from the first portion of the enclosing structure, such that the vibration transferred from the exterior source to the gas in the cavity is detectable by the microphone.

These as well as other aspects, advantages, and alternatives will become apparent to those of ordinary skill in the art by reading the following detailed description, with reference where appropriate to the accompanying drawings.

DETAILED DESCRIPTION

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Voice interaction with computing devices is becoming increasingly common. For example, mobile phones and wearable computing devices can include hardware and software to support voice commands and natural language interactions in various applications. However, voice input can be problematic in noisy environments, where ambient sound can make it difficult to detect and/or distinguish voice input that is intended as input for the device. This may result in voice input going undetected, or perhaps worse, in false triggering of a voice command.

Accordingly, example embodiments may help to improve voice-input functionality by way of a "bone conduction microphone" (BCM). Herein a BCM should be understood to be a microphone apparatus in which a microphone is arranged within a cavity of an enclosing structure having an elastic portion that is capable of transferring vibrations from a bone structure to the gas in the cavity, such that the microphone can detect the vibrations of the bone structure. In example embodiments, such BCMs may be implemented in wearable-device components so as to help isolate speech from the user of the wearable device. Other implementations and applications of example BCMs are also possible.

In some embodiments, a BCM may be implemented as part of or take the form of a component of a computing device, such as nose pad or side-arm of a head-mountable device (HMD). In particular, the device component may include an enclosing structure having a gas-fillable cavity therein. Further, a microphone may be coupled to the device component and located inside of the gas-filled cavity, in order that the wearer's speech can be transferred through the gas in the cavity and detected by the microphone. Additionally, a portion of the enclosing structure may be formed from an elastic material and arranged to contact the wearer at a location where vibrations of the bone structure can be transferred via the wearer's skin and the elastic material to the gas inside the cavity. Examples of such locations include the wearer's nose or temple, among other possibilities.

With such arrangements, vibration of the wearer's bone structure that occurs when the wearer speaks will vibrate the elastic material in a corresponding manner, such that the vibrations are transferred to the gas inside the cavity where they can be detected by the microphone. In particular, when the elastic portion of the enclosing structure is excited by or exposed to vibration, such as that of an HMD's bone structure, the resulting vibration of the elastic portion causes corresponding pressure fluctuations in the cavity, which can in turn be sensed by the microphone.

In an example embodiment, the microphone is separated from the first (elastic) portion of the enclosing structure by at least some of the gas within the cavity. Further, the rest of the enclosing structure may be relative rigid, as compared to the elastic portion of the enclosing structure. This structural arrangement may help to reduce (and hopefully eliminate) the amount of ambient sound (e.g., sound traveling through the air) that can pass through to the inside of the cavity. Configured as such, the microphone may produce an audio signal in such the user's speech is substantially isolated from ambient sound. This in turn may allow for better recognition of the wearer's voice input, among other possible benefits.

In one application of a BCM, a hollow nose pad of a glasses-style HMD may form the enclosing structure for the microphone. More specifically, the nose pad may have a sealed, gas-filled, cavity, and a Microelectromechanical systems (MEMS) microphone may be arranged inside the nose pad's cavity. As such, when the HMD is worn, the MEMS microphone may detect vibrations of the wearer's bone structure corresponding to the wearer's speech, in substantial isolation from any ambient sounds traveling through the air.

In another application of a BCM, a gas-filled enclosing structure for a MEMS microphone may be coupled to or integrated within a side-arm of a glasses-style HMD. The enclosing structure may be located on the side-arm, such that when the HMD is worn, an inward-facing elastic portion of the enclosing structure aligns with, and hopefully contacts, the wearer's temple. As such, when the HMD is worn, the MEMS microphone within the gas-filled enclosing structure can detect vibrations of the wearer's bone structure corresponding to the wearer's speech, in substantial isolation from any ambient sounds traveling through the air. Other applications for BCMs are also possible.

II. Example Bone Conduction Microphone Systems

Figure 1A:
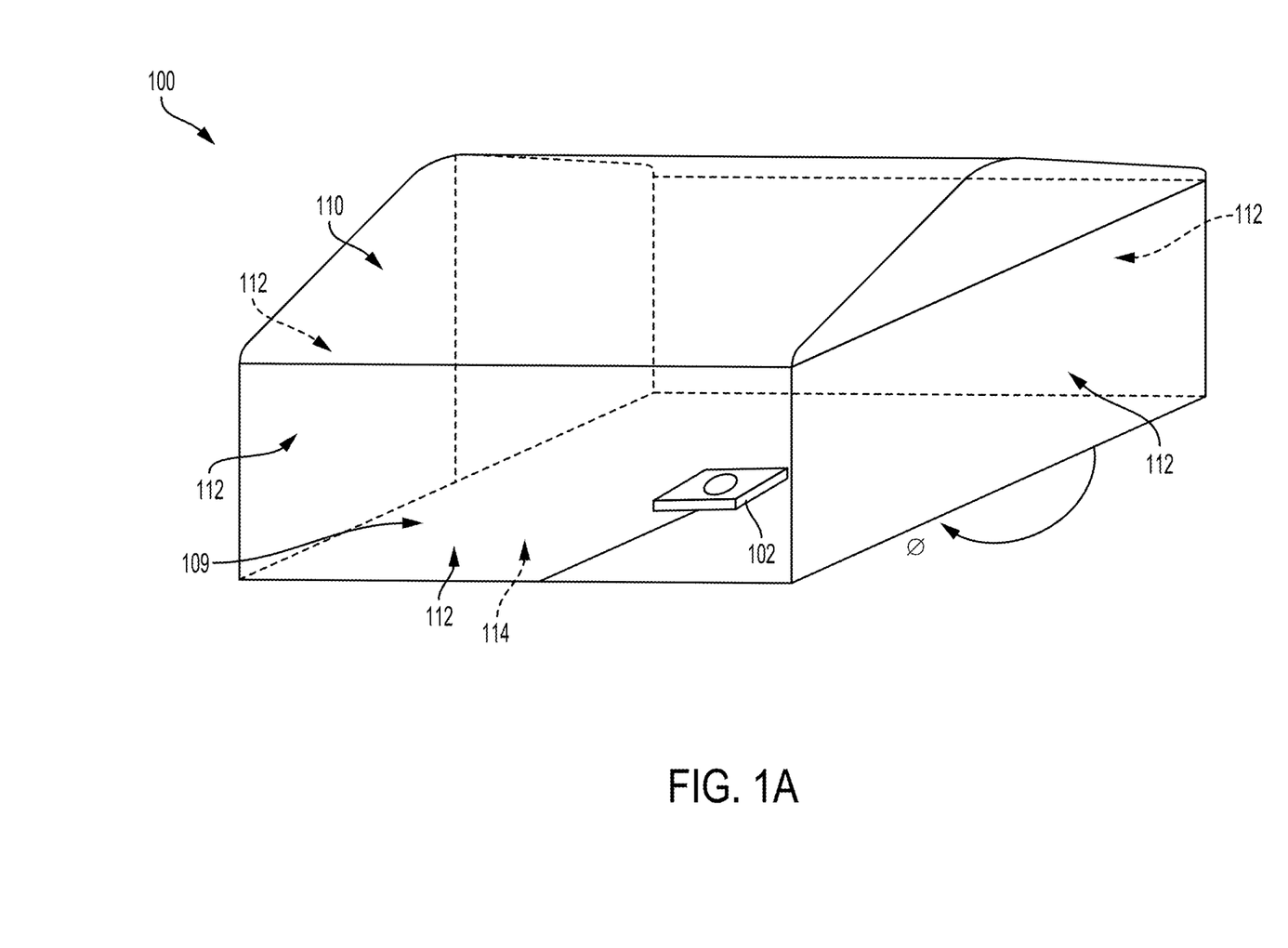
FIG. 1A illustrates an apparatus according to an example embodiment.

FIG. 1A illustrates an apparatus 100, according to an example embodiment. In particular, the apparatus 100 may be a BCM, and thus may also be referred to as BCM 100. As shown, BCM 100 includes a microphone 102 inside of a cavity 104.

In the illustrated example, the cavity 104 is formed by an enclosing structure. More specifically, the enclosing structure has a first portion, which includes a curved surface 110, and a second portion, which includes the bottom surface 114 and the four side surfaces 112. Thus, the first and second portion may collectively enclose cavity 104. In an example embodiment, the first portion (e.g., curved surface 110) is made of a relatively elastic material, and the second portion (e.g., including bottom surface 114 and the four side surfaces 112) is made of more rigid material.

In an example embodiment, the first portion, e.g., curved surface 110, may be formed from an elastic material such as silicon, or formed from another type of flexible material. Other flexible materials may also be utilized for the portion of the enclosing structure that is designed to contact a wearer and transfer vibrations of the wearer's bone structure to the gas in the cavity.

Various materials or combinations of materials may also be utilized for the second portion of the enclosing structure (e.g., for bottom wall 114 and the four side walls 112). In some embodiments, the second portion, or at least a sub-portion thereof, may be made from silicon. In such an embodiment, both the first portion and the second portion may be made from silicon, but the first portion may be made from a thinner layer of silicon than the second portion, such that the first portion is more flexible than the second portion. The second portion or a sub-portion thereof may also be formed by other materials, such as various types of plastic, rubber, and/or metal, among other possibilities. Other materials may also be utilized for the first portion and/or for the second portion, without departing from the scope of the invention.

In an example embodiment, the second portion of the enclosing structure may be formed from a material and of a thickness that is designed to acoustically isolate the cavity from sound traveling through the air outside of the cavity. In a further aspect, the inner surface or surfaces of the second portion, or a sub-portion thereof, may be lined with a sound-absorbing material, such as acoustical foam (e.g., similar to that used in acoustical tiles). This additional layer may help to further isolate the microphone 102 from sound traveling through the air outside of the cavity, such that when the curved surface 110 of BCM 100 contacts a person, the person's speech can be better presented in the output signal of the microphone 102.

In FIG. 1A, the microphone 102 is arranged on the back wall of cavity 104, opposite the elastic first portion 110 of the enclosing structure. Configured as such, when the curved surface is placed against the wearer's skin; e.g., on the nose, temple, or behind the ear, speech vibrations may transfer to the gas in the cavity 104, while ambient sound is substantially prevented from entering cavity 104, thus allowing the microphone 102 to detect the user's voice in substantial isolation from other sounds in the environment.

In other implementations, a microphone may be placed at various other locations within the cavity of a BCM. For example, a microphone could be placed on one of the interior surface of one of the side walls 112. As another example, a microphone could be attached via a member that extends into cavity 104 from the bottom surface 114 or one of the side walls 112 of the enclosing structure, and "floats" the microphone inside the cavity (e.g., such that the microphone does not touch the enclosing structure). Other arrangements of a microphone inside of the cavity are also possible. Further, in some embodiments, a BCM system may include two or more microphones (e.g., a microphone array) arranged within a cavity formed by an enclosing structure.

In practice, the microphone 102 could be one of a number of different types of microphones. For instance, example BCM systems may utilize a Microelectromechanical systems (MEMS) microphone. A MEMS microphone, like other MEMS devices, may be a miniaturized mechanical or electro-mechanical microphone that is made using microfabrication techniques. For example, a MEMS microphone may include a pressure-sensitive diaphragm, which may be etched into a silicon wafer using MEMS processing techniques. Further, a MEMS microphone may include an integrated preamplifier. Further, some embodiments may utilize a digital MEMS microphone, which may be provide on a CMOS chip. This CMOS chip can also include an analog-to-digital converter (ADC) circuit, such that the CMOS chip with the digital MEMS microphone can be readily integrated with other digital electronic devices, such as wearable computing devices. Other embodiments may utilize piezoelectric MEMS microphones. Further, other types of MEMS and non-MEMS microphones could also be utilized in a BCM.

Note that the placement of a microphone that is designed to detect sound traveling through the air, such as a condenser-style MEMS microphone, may help to improve detection of voice input, without adding complexity to a device's voice recognition system. In particular, the BCM system may use the same or a similar type of microphone as is used for the device's open-air microphones (e.g., both may be a MEMS microphone). The use of MEMS microphones for a device's BCM and open-air microphone may allow for the same hardware and/or software to be utilized to process signals from both the BCM system and the open air microphone. For example, a device may include a single digital signal processing (DSP) system for processing signals from the device's BCM system, and from the device's open air microphone.

It is further noted that many existing bone-conduction transducer (BCT) systems use piezoelectric transducers, which can require different signal processing circuitry and/or software than that which is required for typical open-air microphones, such as a MEMS microphone. As such, an example BCM system may help to simplify the device in which it is utilized, as compared if a BCT with piezoelectric transducer were to be utilized instead, by allowing the device to utilize a single DSP for the BCM and open-air microphone(s). Of course, this benefit is not to be interpreted as a requirement, and other benefits of an example BCM are also possible.

In a further aspect, the gas inside the cavity 104 may be intelligently pressurized or depressurized. For example, gas in the cavity 104 of BCM 100 may be pressurized or depressurized to match to the elasticity of the materials that form the enclosing structure for the cavity 104. For example, the gas in the cavity 104 may be more or less pressurized, depending upon whether the elastic first portion 110, which is arranged to contact the wearer, is less or more elastic, respectively. Other factors may also be considered when pressurizing or depressurizing the gas in a microphone cavity.

In an example embodiment, the cavity 104 is sealed and air-tight. It is noted, that arranging a microphone 102 in a sealed cavity 104 that is filled with gas may help to improve the isolation of the user's voice at the microphone 102, as compared to, e.g., an open-air microphone that is not placed in such a cavity. Further, while unsealed or "ported" cavities are also possible, such implementations may not isolate the wearer's voice as well as implementations with a fully-sealed cavity. However, unseal cavities may be utilized, depending upon the particular implementation and/or the design goals for a BCM.

It should be understood that the size and shape of the enclosing structure for the BCM, and the cavity therein, can vary according to the particular implementation. For instance the elastic portion (e.g., curved surface 101) may vary in shape (e.g., varying curvatures and contours) and size according to the part of the body it is designed to contact. Further, in some embodiments, the cavity within the enclosing structure may be sized and shaped to improve detection of vibrations traveling the gas in the chamber. Additionally or alternatively, the size and/or shape of the cavity may be designed so as to improve detection of the voice frequency range (300-3400 Hz) by the microphone. Other variations in the size and/or shape of the enclosing structure and/or the cavity therein are also possible.

III. Illustrative Wearable Device Implementations of BCMs

The BCM systems disclosed herein may be utilized on various types of wearable devices. For example, one or more BCM systems may be coupled to or integrated in a component of a head-mountable device (HMD). It also contemplated that example BCM systems may be coupled to or integrated in other types of HMDs and/or other types wearable devices. Further, a BCM could be utilized on a mobile phone (e.g., at a location on the phone where the phone is expected to contact the user when held to their face to speak), or any other device that could contact a user while the user is speaking.

Figure 1B:
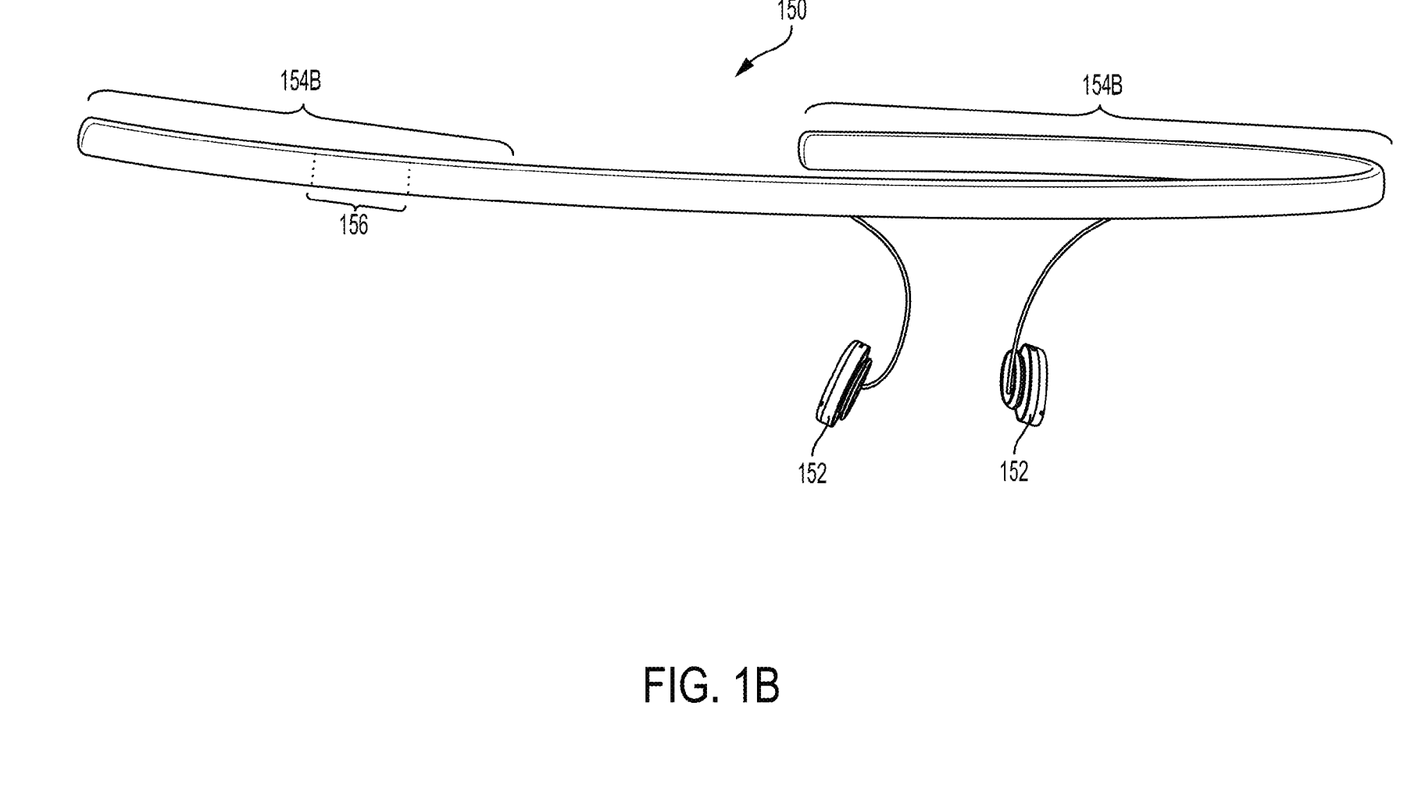
FIG. 1B is an illustration of a frame of a head-mountable device, according to an example embodiment.

FIG. 1B is an illustration of a frame 150 of an HMD, according to an example embodiment. The frame 150 could include one or more BCMs at various locations. For instance, in the illustrated embodiment, frame 150 could include a BCM in one or both nose pads 202.

Additionally or alternatively, a BCM, or possibly multiple BCMs, may be integrated in or arrange on one or both side arms 154A and 154B of the HMD frame 150. In the illustrated example, a BCM is integrated via a hollow segment 156 of side arm 154A. In other embodiments, a BCM could be integrated at or near the tip of a side arm, such that the BCM is configured to contact a wearer behind the wearer's ear. Other arrangements of one or more BCMs on a side arm of an HMD are also possible.

Note that herein, an HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

Figure 2A:
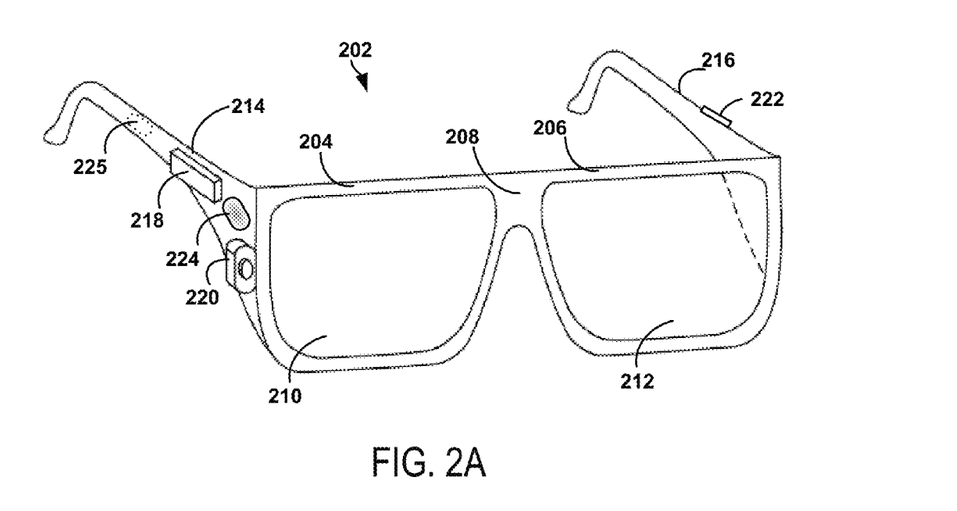
FIG. 2A illustrates a wearable computing system according to an example embodiment.

FIG. 2A illustrates a wearable computing system according to an example embodiment. In FIG. 2A, the wearable computing system takes the form of a head-mountable device (HMD) 202 (which may also be referred to as a head-mounted display). It should be understood, however, that example systems and devices may take the form of or be implemented within or in association with other types of devices, without departing from the scope of the invention. As illustrated in FIG. 2A, the HMD 202 includes frame elements including lens-frames 204, 206 and a center frame support 208, lens elements 210, 212, and extending side-arms 214, 216. The center frame support 208 and the extending side-arms 214, 216 are configured to secure the HMD 202 to a user's face via a user's nose and ears, respectively.

Each of the frame elements 204, 206, and 208 and the extending side-arms 214, 216 may be formed of a solid structure of plastic and/or metal, or may be formed of a hollow structure of similar material so as to allow wiring and component interconnects to be internally routed through the HMD 202. Other materials may be possible as well.

One or more of each of the lens elements 210, 212 may be formed of any material that can suitably display a projected image or graphic. Each of the lens elements 210, 212 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 214, 216 may each be projections that extend away from the lens-frames 204, 206, respectively, and may be positioned behind a user's ears to secure the HMD 202 to the user. The extending side-arms 214, 216 may further secure the HMD 202 to the user by extending around a rear portion of the user's head. Additionally or alternatively, for example, the HMD 202 may connect to or be affixed within a head-mounted helmet structure. Other configurations for an HMD are also possible.

The HMD 202 may also include an on-board computing system 218, an image capture device 220, a sensor 222, and a finger-operable touch pad 224. The on-board computing system 218 is shown to be positioned on the extending side-arm 214 of the HMD 202; however, the on-board computing system 218 may be provided on other parts of the HMD 202 or may be positioned remote from the HMD 202 (e.g., the on-board computing system 218 could be wire- or wirelessly-connected to the HMD 202). The on-board computing system 218 may include a processor and memory, for example. The on-board computing system 218 may be configured to receive and analyze data from the image capture device 220 and the finger-operable touch pad 224 (and possibly from other sensory devices, user interfaces, or both) and generate images for output by the lens elements 210 and 212.

The image capture device 220 may be, for example, a camera that is configured to capture still images and/or to capture video. In the illustrated configuration, image capture device 220 is positioned on the extending side-arm 214 of the HMD 202; however, the image capture device 220 may be provided on other parts of the HMD 202. The image capture device 220 may be configured to capture images at various resolutions or at different frame rates. Many image capture devices with a small form-factor, such as the cameras used in mobile phones or webcams, for example, may be incorporated into an example of the HMD 202.

Further, although FIG. 2A illustrates one image capture device 220, more image capture device may be used, and each may be configured to capture the same view, or to capture different views. For example, the image capture device 220 may be forward facing to capture at least a portion of the real-world view perceived by the user. This forward facing image captured by the image capture device 220 may then be used to generate an augmented reality where computer generated images appear to interact with or overlay the real-world view perceived by the user.

The sensor 222 is shown on the extending side-arm 216 of the HMD 202; however, the sensor 222 may be positioned on other parts of the HMD 202. For illustrative purposes, only one sensor 222 is shown. However, in an example embodiment, the HMD 202 may include multiple sensors. For example, an HMD 202 may include sensors 202 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 224 is shown on the extending side-arm 214 of the HMD 202. However, the finger-operable touch pad 224 may be positioned on other parts of the HMD 202. Also, more than one finger-operable touch pad may be present on the HMD 202. The finger-operable touch pad 224 may be used by a user to input commands. The finger-operable touch pad 224 may sense at least one of a pressure, position and/or a movement of one or more fingers via capacitive sensing, resistance sensing, or a surface acoustic wave process, among other possibilities. The finger-operable touch pad 224 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 224 may be formed of one or more translucent or transparent insulating layers and one or more translucent or transparent conducting layers. Edges of the finger-operable touch pad 224 may be formed to have a raised, indented, or roughened surface, so as to provide tactile feedback to a user when the user's finger reaches the edge, or other area, of the finger-operable touch pad 224. If more than one finger-operable touch pad is present, each finger-operable touch pad may be operated independently, and may provide a different function.

In a further aspect, HMD 202 may be configured to receive user input in various ways, in addition or in the alternative to user input received via finger-operable touch pad 224. For example, on-board computing system 218 may implement a speech-to-text process and utilize a syntax that maps certain spoken commands to certain actions. In addition, HMD 202 may include one or more microphones via which a wearer's speech may be captured. Configured as such, HMD 202 may be operable to detect spoken commands and carry out various computing functions that correspond to the spoken commands.

As another example, HMD 202 may interpret certain head-movements as user input. For example, when HMD 202 is worn, HMD 202 may use one or more gyroscopes and/or one or more accelerometers to detect head movement. The HMD 202 may then interpret certain head-movements as being user input, such as nodding, or looking up, down, left, or right. An HMD 202 could also pan or scroll through graphics in a display according to movement. Other types of actions may also be mapped to head movement.

As yet another example, HMD 202 may interpret certain gestures (e.g., by a wearer's hand or hands) as user input. For example, HMD 202 may capture hand movements by analyzing image data from image capture device 220, and initiate actions that are defined as corresponding to certain hand movements.

As a further example, HMD 202 may interpret eye movement as user input. In particular, HMD 202 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 202 also includes a speaker 225 for generating audio output. In one example, the speaker could be in the form of a bone conduction speaker, also referred to as a bone conduction transducer (BCT). Speaker 225 may be, for example, a vibration transducer or an electroacoustic transducer that produces sound in response to an electrical audio signal input. The frame of HMD 202 may be designed such that when a user wears HMD 202, the speaker 225 contacts the wearer. Alternatively, speaker 225 may be embedded within the frame of HMD 202 and positioned such that, when the HMD 202 is worn, speaker 225 vibrates a portion of the frame that contacts the wearer. In either case, HMD 202 may be configured to send an audio signal to speaker 225, so that vibration of the speaker may be directly or indirectly transferred to the bone structure of the wearer. When the vibrations travel through the bone structure to the bones in the middle ear of the wearer, the wearer can interpret the vibrations provided by BCT 225 as sounds.

Various types of bone-conduction transducers (BCTs) may be implemented, depending upon the particular implementation. Generally, any component that is arranged to vibrate the HMD 202 may be incorporated as a vibration transducer. Yet further it should be understood that an HMD 202 may include a single speaker 225 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 225 can vibrate the wearer's bone structure.

Figure 2B:
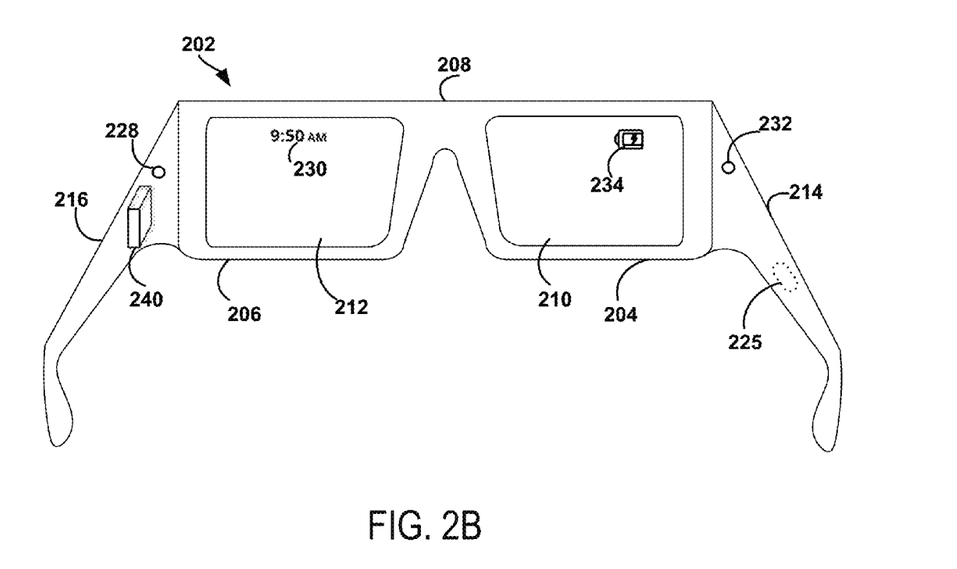
FIG. 2B illustrates an alternate view of the wearable computing device illustrated in FIG. 2A.

FIG. 2B illustrates an alternate view of the wearable computing device illustrated in FIG. 2A. As shown in FIG. 2B, the lens elements 210, 212 may act as display elements. The HMD 202 may include a first projector 228 coupled to an inside surface of the extending side-arm 216 and configured to project a display 230 onto an inside surface of the lens element 212. Additionally or alternatively, a second projector 232 may be coupled to an inside surface of the extending side-arm 214 and configured to project a display 234 onto an inside surface of the lens element 210.

In a further aspect, FIG. 2B shows a BCM 240 on an inner surface of sidearm 116. (Note that while BCM 240 is not shown in FIG. 2A, a BCM could be arranged in the same location in the implementation of HMD 202 shown in FIG. 2A.) BCM 240 may be arranged so as to contact the temple of a wearer, when HMD 202 is worn. Further, BCM 240 may be configured in a similar manner as that described below in reference to FIG. 4B.

Further, note that the lens elements 110, 112 may provide an augmented reality or heads-up display where a projected image or graphic is superimposed over a real-world view as perceived by the user through the lens elements. However, BCMs could also be implemented on an HMD that does not include a display; e.g., where the lens or lenses otherwise function in the same manner as lenses on traditional eyeglasses or sunglasses, or where the wearable device does not include any lens whatsoever. For instance, a wearable device might serve primarily as a device to support voice interaction, so that the user can engage in conversational interactions using microphone(s) such as BCMM 240, speaker(s), and an onboard computing system integrated or communicatively coupled to the wearable device. Such a wearable device may be a dedicated voice interaction device, and thus may not include any type of camera or graphic display. Such an HMD could also tether to a user's mobile phone or other computing devices with displays, so that non-voice related feedback and input would be possible.

Figure 2C:
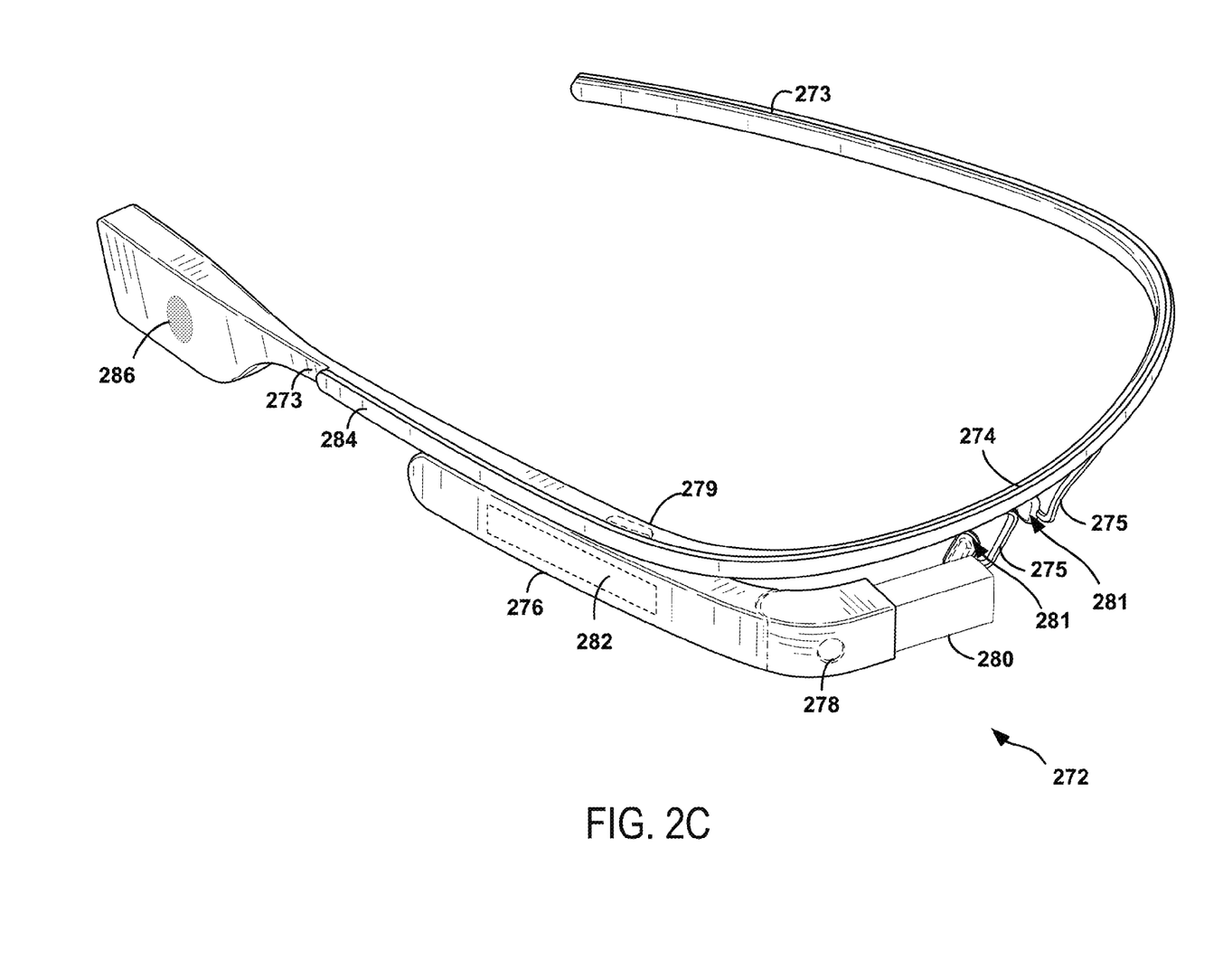
FIG. 2C illustrates another wearable computing system according to an example embodiment.
Figure 2D:
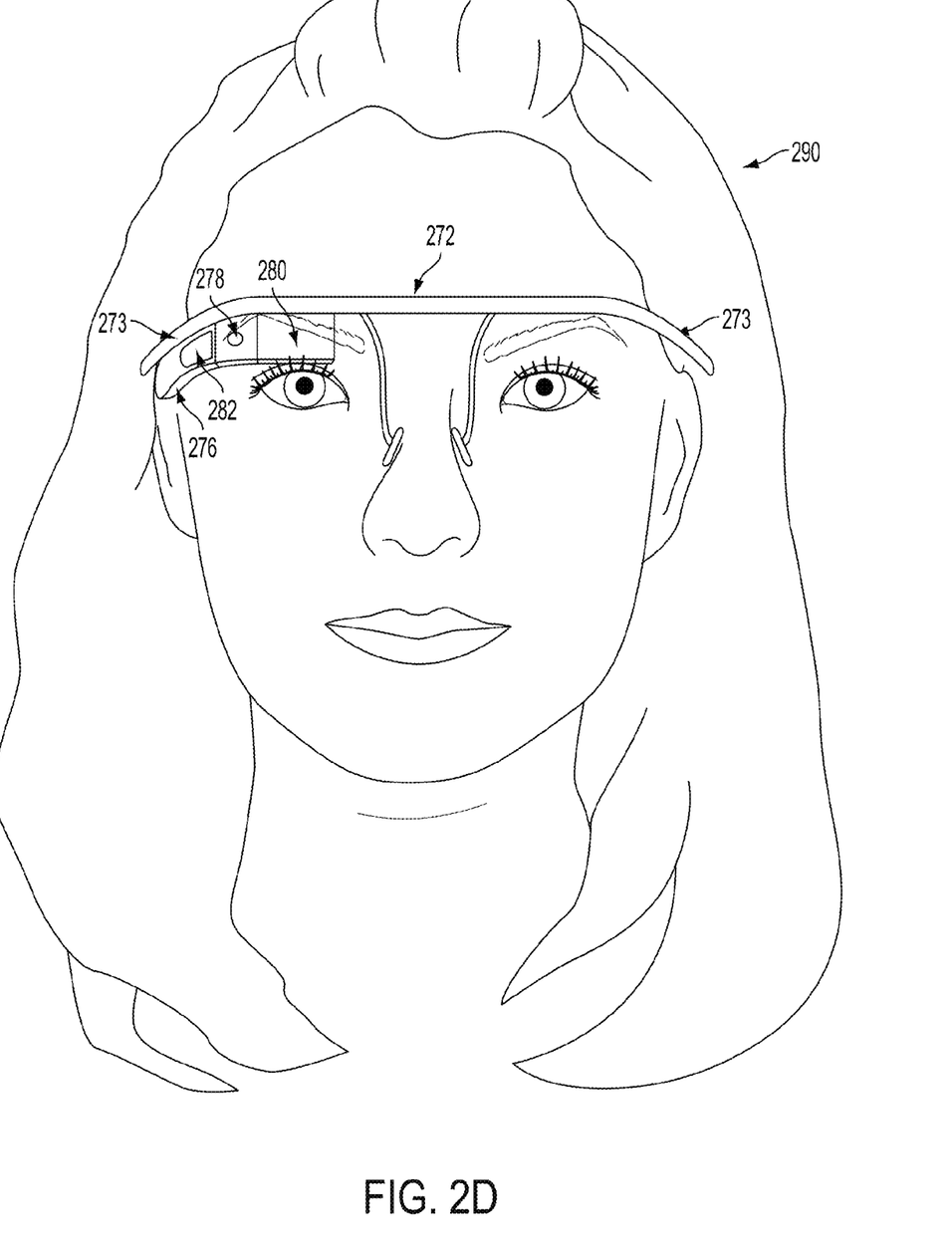
FIG. 2D illustrates another wearable computing system according to an example embodiment.

FIGS. 2C and 2D illustrate another wearable computing system according to an example embodiment, which takes the form of a monocular HMD 272. In particular, FIG. 2C shows a detailed view of HMD 272, while FIG. 2D shows HMD 272 being worn by a wearer 290.

The HMD 272 may include side-arms 273, a center frame support 274, and a bridge portion with nosepieces 275 having nose pads 281 attached thereto. In the example shown in FIG. 2D, the center frame support 274 connects the side-arms 273. The HMD 272 does not include lens-frames containing lens elements. The HMD 272 may additionally include a component housing 276, which may include an on-board computing system (not shown), an image capture device 278, and a button 279 for operating the image capture device 278 (and/or usable for other purposes). Component housing 276 may also include other electrical components and/or may be electrically connected to electrical components at other locations within or on the HMD. HMD 272 also includes a BCT 286. Further, one or both of nose pads 281 may be configured as a BCM, such as that described in reference to FIG. 4A below.

The HMD 272 may include a single display 280, which may be coupled to one of the side-arms 273 via the component housing 276. In an example embodiment, the display 280 may be a see-through display, which is made of glass and/or another transparent or translucent material, such that the wearer can see their environment through the display 280. Further, the component housing 276 may include the light sources (not shown) for the display 280 and/or optical elements (not shown) to direct light from the light sources to the display 280. As such, display 280 may include optical features that direct light that is generated by such light sources towards the wearer's eye, when HMD 272 is being worn.

In a further aspect, HMD 272 may include a sliding feature 284, which may be used to adjust the length of the side-arms 273. Thus, sliding feature 284 may be used to adjust the fit of HMD 272. Further, an HMD may include other features that allow a wearer to adjust the fit of the HMD, without departing from the scope of the invention.

In the illustrated example, the display 280 may be arranged such that when HMD 272 is worn, display 280 is positioned in front of or proximate to a user's eye when the HMD 272 is worn by a user. For example, display 280 may be positioned below the center frame support and above the center of the wearer's eye, as shown in FIG. 2D. Further, in the illustrated configuration, display 280 may be offset from the center of the wearer's eye (e.g., so that the center of display 280 is positioned to the right and above of the center of the wearer's eye, from the wearer's perspective).

Configured as shown in FIG. 2D, display 280 may be located in the periphery of the field of view of the wearer 290, when HMD 272 is worn. Thus, when the wearer 290 looks forward, the wearer 290 may see the display 280 with their peripheral vision. As a result, display 280 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 280 is located as shown, the wearer 290 may view the display 280 by, e.g., looking up with their eyes only (possibly without moving their head). A wearer might also use the display by tilting their head down and aligning their eye with the display 280.

Figure 3:
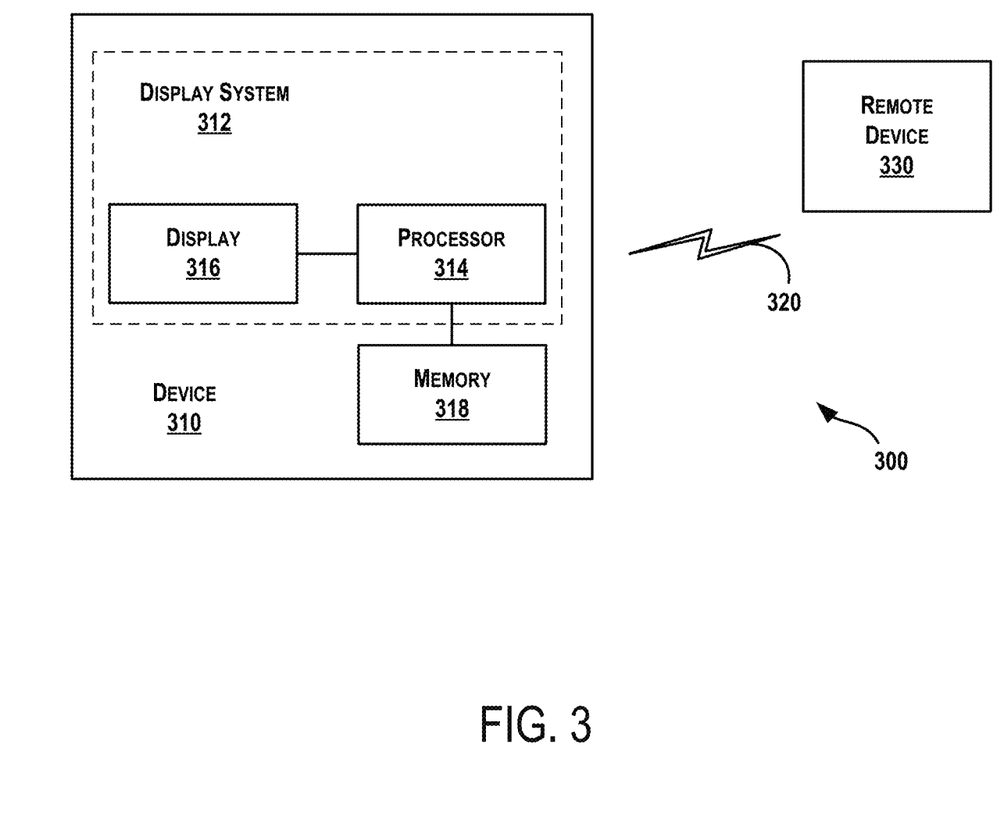
FIG. 3 is a simplified block diagram of a computing device according to an example embodiment.

FIG. 3 is a simplified block diagram of a computing device 310 according to an example embodiment. In an example embodiment, device 310 communicates using a communication link 320 (e.g., a wired or wireless connection) to a remote device 330. The device 310 may be any type of device that can receive data and display information corresponding to or associated with the data. For example, the device 310 may take the form of or include a head-mountable device, such as the head-mountable devices 202, 252, or 272 that are described with reference to FIGS. 2A to 2D. Device 310 may also take the form of other wearable computing devices or a mobile phone, among other possibilities.

The device 310 may include a processor 314 and a display 316. The display 316 may be, for example, an optical see-through display, an optical see-around display, or a video see-through display. The processor 314 may receive data from the remote device 330, and configure the data for display on the display 316. The processor 314 may be any type of processor, such as a micro-processor or a digital signal processor, for example.

The device 310 may further include on-board data storage, such as memory 318 coupled to the processor 314. The memory 318 may store software that can be accessed and executed by the processor 314, for example.

The remote device 330 may be any type of computing device or transmitter including a laptop computer, a mobile telephone, head-mountable display, tablet computing device, etc., that is configured to transmit data to the device 310. The remote device 330 and the device 310 may contain hardware to enable the communication link 320, such as processors, transmitters, receivers, antennas, etc.

Further, remote device 330 may take the form of or be implemented in a computing system that is in communication with and configured to perform functions on behalf of client device, such as computing device 310. Such a remote device 330 may receive data from another computing device 310 (e.g., an HMD 202, 252, or 272 or a mobile phone), perform certain processing functions on behalf of the device 310, and then send the resulting data back to device 310. This functionality may be referred to as "cloud" computing.

In FIG. 3, the communication link 320 is illustrated as a wireless connection; however, wired connections may also be used. For example, the communication link 320 may be a wired serial bus such as a universal serial bus or a parallel bus. A wired connection may be a proprietary connection as well. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 330 may be accessible via the Internet and may include a computing cluster associated with a particular web service (e.g., social-networking, photo sharing, address book, etc.).

IV. Illustrative Nose Pad BCMs

Figure 4A:
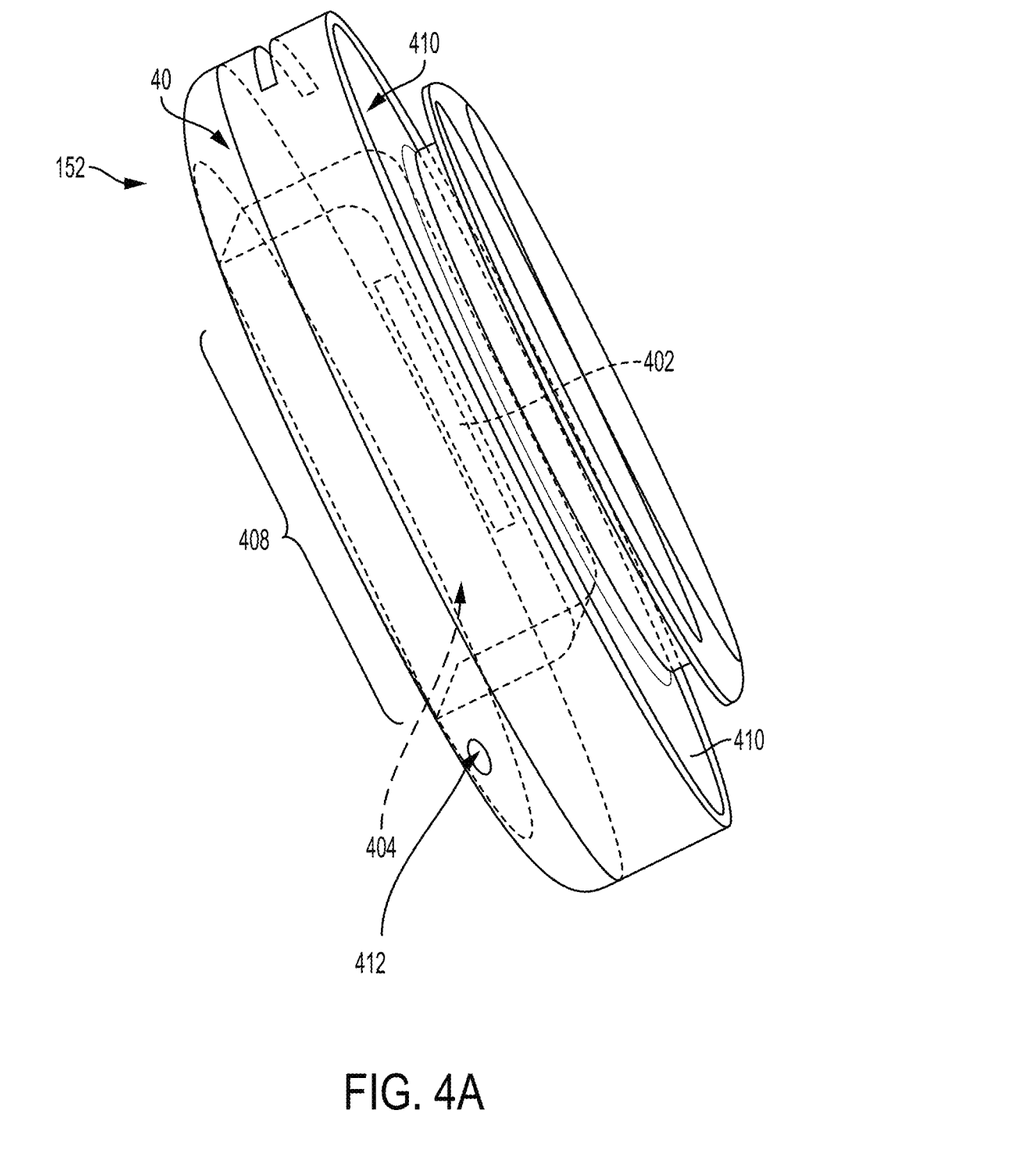
FIG. 4A is an illustration of a bone conduction microphone that takes the form of a nose pad, according to an example embodiment.

As mentioned above in reference to FIG. 1B, a BCM may be integrated in or arranged on a nose pad 152 of a head-mountable device. FIG. 4A is an illustration of a BCM that takes the form of a nose pad 152, according to an example embodiment. The nose pad 152 may have a gas-filled cavity 404 with a microphone 402 therein. The microphone 402 may be a MEMs microphone, or another type of microphone that is typically used to detect sound traveling through the air.

In such an embodiment, the nose pad 152 itself may form the enclosing structure for a cavity 404 in which the microphone 402 is provided. As shown, to provide a BCM, a microphone 402 is located inside of a cavity 404 of the nose pad 400. A first portion of the nose pad 400 is formed by a thin elastic membrane 408, which is arranged to contact the wearer's nose, when the nose pad is worn. Other portions 410 of the nose pad may be formed from less flexible material (e.g., thicker silicon or plastic). Collectively the elastic membrane 408 and the other portions 410 of nose pad 152 may enclose the cavity 404 that houses the microphone 402.

Configured as such, when the elastic membrane 408 of nose pad 152 is contacted to the side of the wearer's nose, the microphone 402 may be able to detect the user's voice in substantial isolation from other sounds in the environment. More specifically, when a head-mountable device having a nose pad 152 is worn, the nose pad 152 may the wearer's nose and transfer vibrations from the wearer's bone structure, which result from the wearer's speech, to gas within the cavity, such that the microphone 402 can detect the wearer's speech. Further, since cavity 404 isolates the microphone 402 from the outside air, microphone 402 may not detect a significant amount of the environmental noise, such that the wearer's noise is substantially isolated, or at least detected more readily, than any other sound in the wearer's environment (including other people's speech).

In a further aspect, the cavity in a nose-pad BCM could include an array of microphones (e.g., two or more microphones). Additionally or alternatively, multiple BCMs could be implemented on the same device (e.g., in both nose pads). Either of these configurations may help to improve the detection of the wearer's speech; e.g., by improving the signal-to-noise ratio (SNR) of the wearer's speech in the output signal that is generated from the signals provided by two or more microphones at different locations on the same device, among other possibilities.

In another aspect, a nose-pad BCM 152 may optionally include a valve 412 which may be used to add and remove gas (e.g., air) from cavity 404. Such a valve 412 may thus be used to increase or decrease the pressure within the cavity 404. Such a feature may be useful to "tune" the BCM to be more or less sensitive. For instance, a user could use increase or decrease the sensitivity of the BCM to the wearer's speech by using an air pump to increase or decrease the air pressure in cavity 404, respectively. Other examples are also possible.

V. Illustrative Side-Arm BCMs

Figure 4B:
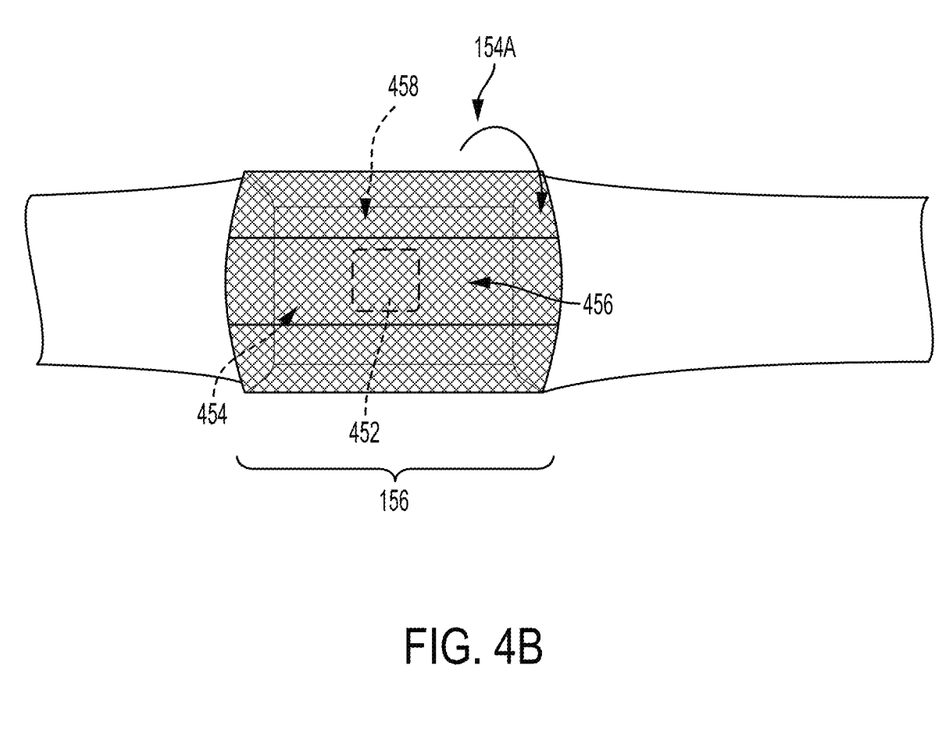
FIG. 4B is an illustration of a bone conduction microphone that takes the form of a side arm according to an example embodiment.

As mentioned above in reference to FIG. 1B, a BCM may be integrated in or arranged on a side arm 154A of a head-mountable device. FIG. 4B is an illustration of a BCM that takes the form of a side arm 154A of an HMD, according to an example embodiment. FIG. 4B shows a view from the inside of side arm 154A (e.g., facing the temple-facing side of the side arm). The side arm 154A may have a hollow segment 156 that encloses a gas-filled cavity 454 with a microphone 452 therein. The microphone 452 may be a MEMs microphone, or another type of microphone that is typically used to detect sound traveling through the air.

The hollow segment 156 may have a first portion 456 that is formed from an elastic material, and a second portion 458 that is formed from a more rigid material or materials (e.g., the same material or materials that form the rest of the side arm 154A). The first portion 456 may act as an elastic membrane, and the side-arm 154A may be arranged on an HMD such that the elastic membrane is on an inner surface of the side-arm 154A (e.g., a surface that faces the wearer when the HMD is worn). As such, the elastic membrane 456 may contact a temple area of the wearer when the HMD is worn, such that vibrations corresponding to the wearer's speech are transferred from the temple area to the microphone 452 via gas in cavity 454.

VI. Conclusion

The above detailed description describes various features and functions of the disclosed systems, devices, and methods with reference to the accompanying figures. Those skilled in the art will recognize that many variations on and different applications of the examples provided herein are possible, without departing from the scope of the invention.

It should be understood that example BCM systems are not limited to use in HMDs or any other type of device. Generally, a BCM system according to an example embodiment may be implemented in any device, and any scenario, where the BCM can be contacted to a person to transfer vibration from a wearer's bone structure to gas in a cavity where the vibration can be detected with a microphone.

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

We claim:

1. An apparatus comprising:
an enclosing structure having a cavity therein, wherein a first portion of the enclosing structure is formed by an elastic material, and wherein the elastic material is moveable to transfer vibration from an exterior source to gas within the cavity;
a microphone coupled to the enclosing structure and located within the gas-filled cavity, wherein gas in the cavity separates the microphone from the elastic first portion of the enclosing structure, such that the vibration transferred from the exterior source to the gas in the cavity is detectable by the microphone; and
a valve that is actuable to change an amount of gas in the cavity, thereby changing the pressure within the cavity.

2. The apparatus of claim 1, wherein the cavity substantially isolates the microphone from vibrations traveling through gas that is outside of the cavity.

3. The apparatus of claim 1, wherein a second portion of the enclosing structure is formed at least in part from an acoustical material that acoustically isolates the cavity from sound traveling through the air outside of the cavity.

4. The apparatus of claim 1, where the microphone comprises a Microelectromechanical systems (MEMS) microphone.

5. The apparatus of claim 1, wherein a second portion of the enclosing structure is formed at least in part from a material that is less elastic than the elastic material that forms the first portion.

6. The apparatus of claim 1, wherein the microphone is coupled to an interior surface of a second portion of the enclosing structure, such that the gas within the cavity separates the microphone from the first portion of the enclosing structure.

7. The apparatus of claim 1, wherein the gas in the cavity is pressurized to a pressure level greater than an ambient air pressure.

8. The apparatus of claim 1, wherein the at least one microphone comprises an array of microphones within the cavity.

9. A wearable-device apparatus comprising:
a device component of a wearable device, wherein at least portion of the device component forms an enclosing structure having a gas-fillable cavity therein, wherein at least a portion of the enclosing structure is formed by an elastic material, and wherein the elastic material is moveable to transfer vibration from an exterior source to gas within the cavity; and
a microphone coupled to the enclosing structure and located within the gas-filled cavity, wherein gas in the cavity separates the microphone from the elastic first portion of the enclosing structure, such that the vibration transferred from the exterior source to the gas in the cavity is detectable by the microphone;
a valve that is actuable to change an amount of gas in the cavity, thereby changing the pressure within the cavity.

10. The apparatus of claim 9, wherein the enclosing structure comprises at least a first wall and a second wall, wherein the cavity is formed by at least the first wall and the second wall.

11. The apparatus of claim 10, wherein the first wall comprises the portion of the enclosing structure formed by the elastic material.

12. The apparatus of claim 10, wherein the first wall is curved to fit against a target body location.

13. The apparatus of claim 9, wherein the device component comprises a side arm.

14. The apparatus of claim 13, wherein the enclosing structure having the microphone within the cavity is located on the side arm such that the first portion formed by the elastic material contacts a temple area when the HMD is worn, such that vibrations corresponding to speech are transferred from the temple area to the microphone via gas in cavity.

15. The apparatus of claim 9, wherein the device component comprises a nose pad.

16. The apparatus of claim 15, wherein the nose pad forms the enclosing structure having the cavity therein, such that the microphone is arranged within the nose pad.

17. The apparatus of claim 16, wherein the nose pad is coupled to a support structure of a head-mountable device (HMD) such that the first portion formed from the elastic material contacts a nose area when the HMD is worn, such that vibrations corresponding to speech are transferred from the nose area to the microphone via gas in cavity.

18. The apparatus of claim 9, where the microphone comprises a Microelectromechanical systems (MEMS) microphone.

* * * * *